(12) United States Patent
Kondoh et al.

(10) Patent No.: US 8,178,067 B2
(45) Date of Patent: May 15, 2012

(54) METHOD OF MAKING AMORPHOUS SILICON POWDER

(75) Inventors: Katsuyoshi Kondoh, Minoh (JP); Yoshisada Michiura, Izumisano (JP)

(73) Assignee: Kurimoto, Ltd., Osaka (JP)

( * ) Notice: Subject to any disclaimer, the term of this patent is extended or adjusted under 35 U.S.C. 154(b) by 512 days.

(21) Appl. No.: 11/991,070

(22) PCT Filed: Aug. 29, 2006

(86) PCT No.: PCT/JP2006/316948
§ 371 (c)(1), (2), (4) Date: Feb. 27, 2008

(87) PCT Pub. No.: WO2007/026680
PCT Pub. Date: Mar. 8, 2007

(65) Prior Publication Data
US 2009/0148578 A1    Jun. 11, 2009

(30) Foreign Application Priority Data
Aug. 31, 2005    (JP) .................................. 2005-250593

(51) Int. Cl.
*C01B 33/12*    (2006.01)
(52) U.S. Cl. ........................................ 423/335
(58) Field of Classification Search .................. 423/335
See application file for complete search history.

(56) References Cited

U.S. PATENT DOCUMENTS

| | | | |
|---|---|---|---|
| 6,406,678 B1 * | 6/2002 | Shipley | 423/335 |
| 6,696,036 B2 * | 2/2004 | Victor et al. | 423/337 |
| 2003/0096900 A1 * | 5/2003 | Holden | 524/492 |
| 2004/0175321 A1 * | 9/2004 | De Souza et al. | 423/335 |

FOREIGN PATENT DOCUMENTS

| | | |
|---|---|---|
| JP | 63-134553 | 6/1988 |
| JP | 5-194007 | 8/1993 |
| JP | 7-57684 | 6/1995 |
| JP | 8-169711 | 7/1996 |
| JP | 11-323752 | 11/1999 |
| JP | 2004-527445 | 9/2004 |
| JP | 2005-22895 | 1/2005 |
| JP | 2005-213118 | 8/2005 |

OTHER PUBLICATIONS

Real et al. "Preparation of Silica from Rice Husks", Journal of the American Ceramic Society 79 (8) 2012-16 (1996).*
Chakraverty et al. "Investigation of combustion of raw and acid-leached rice husks for production of pure amorphous white silica", Journal of Materials Science 23 (1988) 21-24.*

(Continued)

*Primary Examiner* — Stanley Silverman
*Assistant Examiner* — Anthony J Zimmer
(74) *Attorney, Agent, or Firm* — Clark & Brody (57) ABSTRACT

A production method of amorphous silicon oxide powder comprises a step of preparing a wood, agricultural crop or plant containing hexose and/or pentose and silicon oxide as a starting raw material, a step of hydrolyzing the starting raw material with nitric acid, hydrochloric acid, sulfuric acid, phosphoric acid or organic acid to reduce a content of the hexose to 10% by weight or less and/or a content of the pentose to 20% by weight or less, and a step of burning residue yielded in the hydrolyzing step at a temperature of 400° C. to 1200° C.

2 Claims, 3 Drawing Sheets

OTHER PUBLICATIONS

Krishnarao et al. "Studies on the Formation of black particles in rice husk silica ash", Journal of the European Ceramic Society 21 (2001) 99-104.*

Chandrasekhar et al. "Review Processing, properties and applications of reactive silica from rice husk—an overview", Journal of Materials Science 38 (2003) 3159-3169.*

Machine Translation of JP05-194007. Published Aug. 3, 1993.*

Kouji Miwa et al, "Biomass Ethanol Technique", Chemical Equipment issued in Jul. 2003, pp. 69-73.

"Chemical Industrial Report" issued on Jul. 22, 2005.

Katsuyoshi Kondoh et al., Abstracts of Autumn Meeting of Japan Society of Powder and Powder Metallurgy in 2004, p. 148.

Katsuyoshi Kondoh, "Solid-phase Recycle Technique on Magnesium Alloy" Spring Proceedings of Journal of the Japan Institute of Metals in Mar. 28, 2005.

Katsuyoshi Kondoh et al., "Innovative Reuse of Agricultural Wastes as Industrial Raw Materials to form Magnesium Composites", ICMAT 2005 & IUMRS-ICAM2005 of Jul. 6, 2005, Materials Research Society of Singapore.

Qingge Feng et al., "Thermal Decomposition of Hydrochloric Acid Treated Rice Husk and Properties of Its Product", Journal of The Society of Inorganic Materials, Japan, 2002, vol. 9, pp. 505-510.

G. Hou et al., "Study on the Preparation $SiO_2$ with high Purity and High Surface Area from Rice Husk", Center of Physical Testing and Chemical Analysis, Yancheng Institute of Technology, Jiangsu Yancheng 22403, China), 2004, p. 458-460 and 469.

* cited by examiner

METHOD OF MAKING AMORPHOUS SILICON POWDER

TECHNICAL FIELD

The present invention relates to high-purity amorphous silicon oxide powder and its production method, and more particularly, to amorphous silicon oxide powder produced from residue (cascade) containing silicon oxide and provided after sugar content has been extracted from a wood, agricultural crop, or plant serving as a biomass fuel.

BACKGROUND ART

Kyoto Protocol officially came into effect in February 2005 to take measures against global warming, and planning and execution of effective measures for reduction in $CO_2$ have attracted worldwide attention. Under such circumstances, it is greatly expected to practically use biomass energy as recycled and new "carbon-neutral" energy. The "carbon-neutral" energy means that since the wood, agricultural crop and plant serving as fuels absorb $CO_2$ in the atmosphere through photosynthesis in their growing processes, even when $CO_2$ is produced in a burning process to create energy, $CO_2$ is not increased in the atmosphere substantially.

Methods of producing the biomass energy include a method of generating electricity (thermal and electric energy) by burning, a method of producing gas (mixed gas of methane, hydrogen and carbon monoxide) by partial burning, and a method of generating methane gas or ethanol fuel by fermentation. When the wood or agricultural crop such as sugarcane, corn, and chaff (or its residue) is used as a fuel in each of the above production methods, unnecessary and spent fuel (biomass cascade) is always left after the energy has been extracted.

Focusing on the biomass energy that is practically used at the present, most part of various kinds of biomass cascade such as residue provided after ethanol has been refined from an agricultural crop in America and Brazil, combustion ash provided after chaff has been burned for electric generation in Thailand is disposed by a for-profit waste disposal service and only a part of it is given back to a farmland as fertilizer or used as a cement admixture. However, since these prices are very low such as several tens of yen per ton in Japanese yen, the cost for transporting the cascade to the farmland or a cement factory is equal to the cost for the above for-profit waste disposal service, which is a serious negative factor in the business using the biomass energy.

For example, Japanese company, TSUKISHIMA KIKAI CO., LTD. developed a technique to produce ethanol fuel from hexose such as cellulose or starch and pentose such as hemicellulose contained in a fuel such as a wood or corn by hydrolyzing the fuel with diluted sulfuric acid and decomposing glucose with enzyme and fermenting ethanol with yeast (adapted from "Chemical Equipment" issued in July 2003, p. 69-73). In addition, Sojitz Research Institute developed a technique for producing fuel ethanol by fermenting ground rice produced in Vietnam (adapted from Chemical Industry Report on Jul. 22, 2005). In either biomass technique, biomass cascade as residue after sugar has been extracted is compressed and solidified and recycled only as a solid burning fuel for a plant.

Meanwhile, a method for extracting high-purity silicon oxide from silicon oxide in a biomass fuel has been studied and developed. For example, a method for producing silicon oxide by burning chaff that is one of the agricultural crops and thermally decomposing cellulose, hemicellulose, and lignin has been proposed. For example, the methods are disclosed in Autumn Proceedings of Journal of the Japan Society of Powder and Powder Metallurgy in 2004: Process Design on Active Reuse of Chaff Ash by Solid-Phase Synthesis Method (p. 148, Katsuyoshi Kondoh, et al.), Spring Proceedings of Journal of the Japan Institute of Metals in 2005 (Mar. 28, 2005): Solid-phase Recycle Technique on Magnesium Alloy (Katsuyoshi Kondoh), and ICMAT 2005 & IUMRS-ICAM2005 (Jul. 6, 2005): Innovative Reuse of Agricultural Wastes as Industrial Raw Materials to Form Magnesium Composites (Katsuyoshi Kondoh et al.).

According to the above burning methods, since alkaline metal element contained in the chaff, especially potassium (K) reacts with silicon oxide in a heating process and carbon (C) contained in cellulose and/or hemicellulose is introduced in silicon oxide as residual carbon, purity of silicon oxide is as low as 88 to 90%. Meanwhile, when the chaff is burned at 800 to 900° C. or more, since cellulose and/or hemicellulose is completely decomposed and removed, a silicon oxide content can be 95% or more. However, such heating at a high temperature within the above range causes silicon oxide to be crystallized. The crystallized silicon oxide is not only inferior in function as compared with amorphous silicon oxide but also adversely affects a human body. According to IARC (International Agency for Research on Cancer) that is an affiliated organization of WHO (World Health Organization), since crystalline silica belongs to carcinogens (group 1), it is restricted in use similar to asbestos. Therefore, it is difficult to produce high purity amorphous silicon oxide from the biomass by the above burning method.

In addition, a method of producing high-purity silica from chaff has been proposed. For example, Japanese Examined Patent Publication No. 7-57684 discloses "production method of high-purity silica from chaff". According to the method disclosed in this document, chaff is treated with a solution of hydrofluoric acid (HF) to extract a silicon compound contained in the chaff to produce silica. More specifically, the silicon compound provided after the treatment with the solution of hydrofluoric acid is extracted as hexafluorosilicic acid ($H_2SiF_6$) and the extract is added with ammonia and decomposed via ammonium hexafluorosilicate (($NH_4)_2 SiF_6$) into ammonium fluoride ($NH_4F$) and silica ($SiO_2$), and this is separated by filtration, washed in water and dried to obtain amorphous silicon oxide powder. According to this method, the problem is that economic efficiency is lowered because expensive hydrofluoric acid is used and an equipment to be used needs to be made of an expensive material because hydrofluoric acid has strong corrosive aggressiveness.

Meanwhile, a production method of a material with a high silica content from a wood such as chaff has been proposed. For example, Japanese Unexamined Patent Publication No. 11-323752 discloses "production method of material with high contents of silica, cellulose and lignin". According to the method disclosed in this document, after blasting or steaming treatment of a wood such as chaff, rice straw or bagasse (the wood is immersed into a solution such as hydrochloric acid, sulfuric acid or nitric acid and heated and pressurized), the wood is burned at 550 to 900° C. (more preferably, at 600 to 700° C.), whereby amorphous silicon oxide having $SiO_2$ content of 95% is produced. In other words, it is necessary to thermally dissolve and remove an impurity by heating and burning at a higher temperature to produce high-purity silicon oxide having purity of 96% or more. However, the problem is that such high-temperature heating causes a crystal structure of the silicon oxide to be crystallized (become cristobalite).

Furthermore, a production method of amorphous silica fine powder from chaff has been proposed. For example, Japanese Unexamined Patent Publication No. 5-194007 discloses "production method of amorphous silica fine powder and concrete product blended with amorphous silica fine powder". According to the method disclosed in this document, amorphous silica fine powder is produced by immersing chaff in a solution of hydrochloric acid and burning and grinding it. More specifically, the chaff is immersed in a hydrochloric acid solution having a concentration of about 10% for a short time to melt an alkaline organic element such as potassium, and burned at 600 to 700° C. Here, when it is burned at a temperature above 800° C., the problem is that silicon oxide becomes cristobalite (crystallized). Meanwhile, when it is burned at a temperature below 600° C., unburned carbon remains and purity of the silica powder is lowered. In other words, since the burning temperature of the chaff after treated with acid is limited to the above 600 to 700° C. and the temperature management range is small, when it is produced actually, quality varies-due to unburned carbon and crystallization of silica.

Furthermore, a production method of high-purity amorphous silica from chaff has been proposed. For example, Japanese National Publication of PCT Application No. 2004-527445 discloses "production method of high-purity amorphous silica from biogenic material". According to the method disclosed in this document, a long-chain hydrocarbon compound such as lignin or cellulose is reduced to further combustible (volatile) short-chain hydrocarbon compound by immersing a biogenic material such as chaff in a solution having an oxidizing solute (selected from a group comprising peroxide, hydrogen peroxide, nitrate salt and permanganate) to reduce an amount of carbonaceous residual material of silica produced by the next process of burning. The burning temperature at that time is preferably 500 to 950° C., and crystallization of silica is accelerated in the high-temperature range.

In order to spread the biomass technique widely, it is necessary to reduce the total cost of the biomass energy by producing a high-value added product from the biomass cascade left as residue. More specifically, focusing on silicon oxide mainly contained in the cascade, a production method of amorphous silicon oxide having purity of 96% or more is to be established.

SUMMARY OF THE INVENTION

It is an object of the present invention to produce high-purity amorphous silicon oxide powder from a wood, agricultural crop, or plant.

It is another object of the present invention to provide a cosmetic material, concrete material, crucible material, refractory product, coating material, rubber material, filter, filtering material, paper product, cloth product, glass product, food product, composition eradiating far-infrared rays and the like using the high-purity amorphous silicon oxide powder.

According to the present invention, silicon oxide powder having high purity and an amorphous structure is produced by heating biomass cascade at a temperature within an appropriate range to decompose an impurity in the cascade. Such high-purity amorphous silicon oxide can be used for a cosmetic material, admixture of high-strength concrete, crucible material, coating material and the like.

According to one aspect, amorphous silicon oxide powder according to the present invention is provided by burning a starting raw material mainly comprising silicon oxide ($SiO_2$) and containing 10% by weight or less of hexose and/or 20% by weight or less of pentose, in which a carbon content is 0.5% by weight or less, a total content of metal elements of potassium (K), phosphorus (P), calcium (Ca), sodium (Na), aluminum (Al), magnesium (Mg), and iron (Fe) is 0.7% by weight or less, and a silicon oxide content is 96% by weight or more.

According to one embodiment, the starting raw material contains 40% by weight or less of polyphenol. In addition, the total content of the metal elements of potassium (K), phosphorus (P), calcium (Ca), sodium (Na), aluminum (Al), magnesium (Mg), and iron (Fe) in the starting raw material is preferably 1.5% by weight or less.

The hexose is at least one selected from a group comprising glucose, cellulose, starch, maltose, sucrose, fructose, ribulose, galactose, talose, and allose. The pentose is at least one selected from a group comprising hemicellulose, apiose, and ribose.

The starting raw material is residue provided by hydrolyzing a raw material such as a wood, thinned wood, construction debris, sawdust, bark, rice, chaff, rice straw, wheat straw, buckwheat chaff, seed of sunflower, seed of fruit, bagasse, corn, sugarcane, sweet potato, soybean, peanut, coffee bean, cassava, eucalyptus, fern, pineapple, bamboo, activated carbon, rubber, or used paper, with nitric acid, hydrochloric acid, sulfuric acid, phosphoric acid or organic acid.

The amorphous silicon oxide powder according to any one of the above description can be used for a crucible material and filter or filtering material as starting raw materials, a cosmetic material as an admixture material, a mortar concrete material as an admixture material, and a coating material as an additive agent and/or pigment. Furthermore, the amorphous silicon oxide powder according to any one of the above description can be used for a rubber material as a reinforcing agent or additive agent and a refractory product as a reinforcing material. Furthermore, the amorphous silicon oxide powder according to any one of the above description can be used for a paper product, cloth product, glass product, and food product as additive materials.

In addition, since the amorphous silicon oxide powder according to any one of the above description provides a high radiation effect of far-infrared rays depending on a process condition, a product having a preferable radiation effect of far-infrared rays can be produced by mixing the amorphous silicon oxide powder to its material.

A production method of amorphous silicon oxide powder according to the present invention comprises a step of preparing a wood, agricultural crop or plant containing hexose and/or pentose and silicon oxide as a starting raw material, a step of hydrolyzing the starting raw material with nitric acid, hydrochloric acid, sulfuric acid, phosphoric acid or organic acid to reduce a hexose content to 10% by weight or less and/or a pentose content to 20% by weight or less, and a step of burning residue yielded in the hydrolyzing step at a temperature of 400 to 1200° C.

The starting raw material is selected from a group comprising a wood, thinned wood, construction debris, sawdust, bark, rice, chaff, rice straw, wheat straw, buckwheat chaff, seed of sunflower, seed of fruit, bagasse, corn, sugarcane, sweet potato, soybean, peanut, coffee bean, cassava, eucalyptus, fern, pineapple, bamboo, activated carbon, rubber, and used paper.

The burning temperature of the residue is preferably 900 to 1100° C. In addition, a polyphenol content in the residue yielded in the hydrolyzing step is preferably 40% by weight or less.

The meaning and effect and the like of the above defined contents will be described in the following section.

DESCRIPTION OF THE PREFERRED EMBODIMENTS

Figure 1:
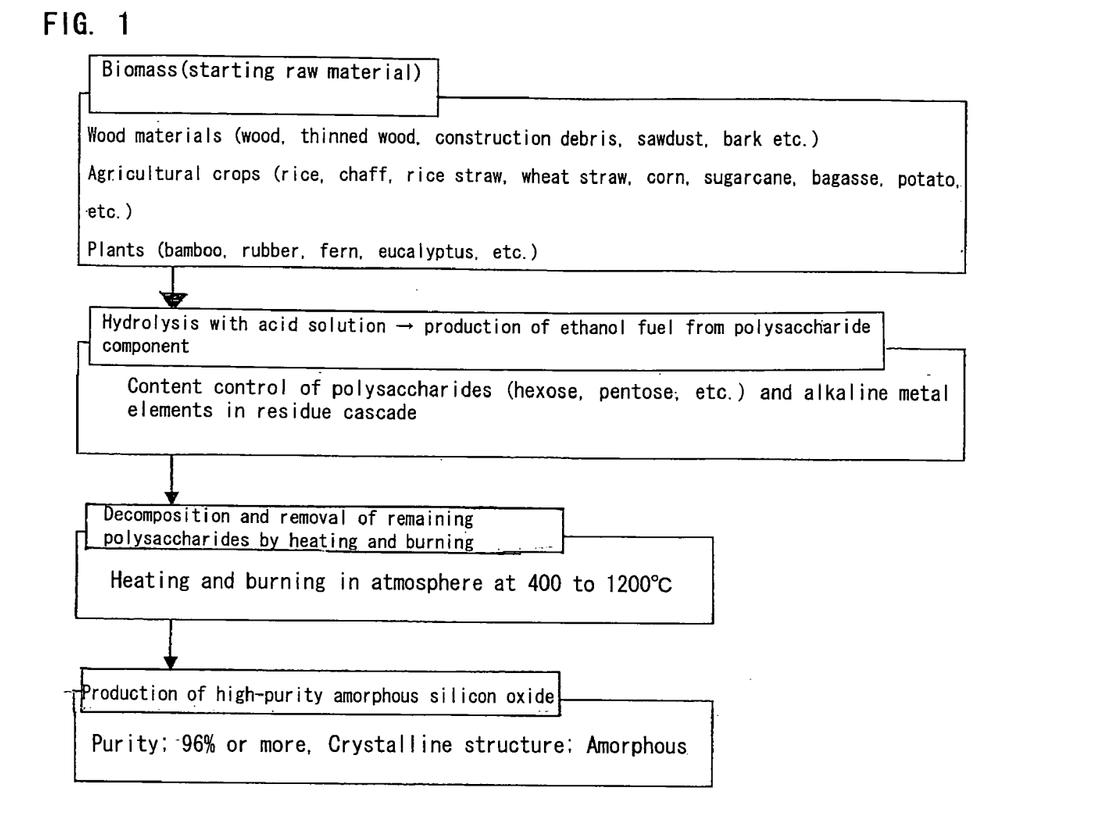
FIG. 1 is a flowchart showing one example of a production method according to the present invention.

FIG. 1 is a flowchart showing one example of a production method of amorphous silicon oxide powder according to the present invention. As shown in FIG. 1, the inventors of the present invention have found that when biomass cascade that is residue provided after polysaccharide has been extracted from a biomass starting raw material such as a wood, agricultural crop or plant is heated and burned under a preferable condition, high-purity amorphous silicon oxide powder can be provided. In order to implement this, components of the biomass cascade and a production condition and a burning condition of the cascade are to be managed appropriately as follows.

(1) Components of Biomass Cascade
(i) Hexose

A hexose content in the biomass cascade according to the present invention is 10% by weight or less. A hexose content in biomass such as a wood or agricultural crop is about 30 to 80% and an ethanol fuel is produced by hydrolyzing with acid and fermenting this. At this time, the biomass cascade is produced and silicon oxide is produced by burning it. Here, in a case where the hexose remains in the cascade, while alkaline metal in the cascade, especially potassium (K) reacts with silicon oxide in the next burning process, it also reacts with the hexose, so that carbon (C) is introduced therein. As a result, residual carbon and oxygen are contained in large amounts in the silicon oxide after the burning process and purity of the silicon oxide is as low as 88 to 90% and a carbon content is about 1 to 10% by weight.

According to the present invention, it has been confirmed that when the hexose content in the cascade is set to 10% by weight or less, the carbon content in the silicon oxide is 0.5% by weight or less, and the purity of silicon oxide is 96% or more. In addition, the hexose content in the cascade is preferably 5% by weight or less. When it is 5% by weight or less, even when the burning temperature of the cascade is 900° C. or less, an impurity other than silicon oxide is thermally decomposed and the purity of silicon oxide can be 96% or more.

Furthermore, when the burning temperature is set to 900 to 1100° C., the thermal decomposition of the remaining hexose is accelerated and as a result, the silicon oxide content can be above 97% by weight.

In addition, the hexose is at least one among glucose, cellulose, starch, maltose, sucrose, fructose, ribulose, galactose, talose, and allose.

(ii) Pentose

A pentose content in the biomass cascade according to the present invention is 20% by weight or less. A pentose content in the biomass such as the wood or agricultural crop is about 10 to 30% and an ethanol fuel is produced by hydrolyzing with acid and fermenting this. Similar to the hexose, in a case where the pentose remains in the cascade, while alkaline metal in the cascade, especially potassium (K) reacts with silicon oxide in the next burning process, it also reacts with the pentose, so that carbon (C) is introduced therein. As a result, residual carbon and oxygen are contained in large amounts in silicon oxide after the burning process and purity of silicon oxide is as low as 90% and a carbon content is about 1 to 10% by weight.

According to the present invention, it has been confirmed that when the pentose content in the cascade is set to 20% by weight or less, the carbon content in the silicon oxide is 0.5% by weight or less, and the purity of silicon oxide is 96% or more. In addition, the pentose content in the cascade is preferably 10% by weight or less. When it is 10% by weight or less, even when the burning temperature of the cascade is 900° C. or less, an impurity other than silicon oxide is thermally decomposed and the purity of silicon oxide can be 96% or more.

Furthermore, when the burning temperature is set to 900 to 1100° C., the thermal decomposition of the remaining pentose is accelerated and as a result, the silicon oxide content can be above 97% by weight.

In addition, although the pentose mainly comprises hemicellulose here, it may include apiose, ribose and the like.

(iii) Polyphenol

A polyphenol content in the biomass cascade according to the present invention is 40% by weight or less. Here, polyphenol includes lignin, flavonoid, phenol acid, and ellagic acid. For example, a lignin content in the biomass such as the wood and agricultural crop is about several % to 20%. Similar to the hexose and pentose, in a case where polyphenol remains in the cascade, while alkaline metal in the cascade, especially potassium (K) reacts with silicon oxide in the next burning process, it also reacts with polyphenol, so that carbon (C) is introduced therein. As a result, residual carbon is contained in large amounts in silicon oxide after the burning process and purity of the silicon oxide is lowered to 90% and a carbon content is about 1 to 10% by weight.

According to the present invention, it has been confirmed that when the polyphenol content in the cascade is set to 40% by weight or less, the carbon content in the silicon oxide is 0.5% by weight or less, and the purity of the silicon oxide is 96% or more. In addition, the polyphenol content in the cascade is preferably 10% by weight or less. When it is 10% by weight or less, even when the burning temperature of the cascade is 900° C. or less, an impurity other than silicon oxide is thermally decomposed and the purity of silicon oxide can be 96% or more.

Furthermore, when the burning temperature is set to 900 to 1100° C., the thermal decomposition of the remaining polyphenol is accelerated and as a result, the silicon oxide content can be above 97% by weight.

In addition, the method similar to that of the present invention is proposed in the above described Japanese Unexamined Patent Publication No. 11-323752 disclosing "production method of material with high contents of silica, cellulose and lignin". However, in this document, there is no description or definition about the contents of cellulose and lignin in a wood before ashing (burning) process. According to the document, the burning temperature to produce amorphous silicon oxide (silica) is 900° C. or less, and when the burning temperature exceeds 900° C., cristobalite is generated (crystallized). In addition, a silicon oxide content is about 95 to 96% in a sample burned (ashing process) at 600° C. in a working example.

Thus, the present invention is greatly different from the conventional technique in that the content of the polysaccharide such as cellulose and lignin and the content of the alkaline metal elements in the wood before burning are controlled so as to have the appropriate values or less to raise the crystallization temperature, so that the thermal decomposition of the impurity is accelerated and the purity of silicon oxide can be further improved. In addition, when the crystallization temperature is raised, the burning temperature range of the cascade is increased and a temperature can be easily managed in the manufacturing process. As a result, quality can be stabilized in purity and amorphous structure as compared with that in the conventional technique.

(iv) Alkaline Metal

The total content of the metal elements of potassium (K), phosphorus (P), calcium (Ca), sodium (Na), aluminum (Al), magnesium (Mg), and iron (Fe) in the cascade according to the present invention is 1.5% by weight or less. These alkaline metal elements exist in the biomass and residual cascade as their oxides. These oxides react with silicon oxide in the heating process of the cascade and also react with the polysaccharide such as cellulose and/or hemicellulose and carbon (C) is introduced. As a result, a carbon content in the burned silicon oxide is increased and purity of silicon oxide is lowered.

When the total content of the metal elements exceeds 1.5% by weight, the carbon content is abruptly increased. Especially, since potassium is likely to react with silicon oxide, it is desirable to manage a potassium content in the cascade so as not to exceed 1% by weight.

In addition, the biomass (used for extracting fuel) is a wood, thinned wood, construction debris, sawdust, bark, rice, chaff, rice straw, wheat straw, buckwheat chaff, seed of sunflower, seed of fruit (seed of grape, for example), bagasse, corn, sugarcane, sweet potato, soybean, peanut, coffee bean, cassava, eucalyptus, fern, pineapple, bamboo, activated carbon, rubber, or used paper.

(2) Production Condition of Biomass Cascade

When the biomass is hydrolyzed under an appropriate condition, the contents of hexose and pentose and polyphenol can be managed within the above appropriate range. More specifically, when the biomass such as a wood, agricultural crop and plant is immersed in nitric acid aqueous solution, hydrochloric acid aqueous solution, sulfuric acid aqueous solution, or phosphoric acid aqueous solution, a polysaccharide component contained in cells and cell walls in the biomass is decomposed. Although a hydrolyzing condition varies depending on the biomass to be used, an acid concentration is 0.5 to 10%, and a temperature is room temperature to 250° C., and an immersing time is 1 to 10 minutes in general. In addition, the polysaccharide can be efficiently hydrolyzed when a pressure is applied to the biomass, the biomass is stirred in the acid solution, and an ultrasonic oscillation is applied to it as external force applied to the biomass.

The inventors of this application have confirmed that the same effect can be provided when the biomass is hydrolyzed with an organic acid such as acetic acid, oxalic acid, and citric acid instead of the above inorganic acid.

In addition, the hydrolyzing processes are performed in two stages in some cases depending on the kind of the biomass. For example, in the case of wood biomass, a pentose solution such as hemicellulose is extracted by a first hydrolyzing process with diluted sulfuric acid, and a hexose solution is extracted from residue provided after the first hydrolyzing process, by a second hydrolyzing process. In a case where the hydrolyzing is not sufficiently performed, the hexose content in the cascade exceeds 10% by weight and the contents of the pentose and polyphenol exceed 20% by weight and 40% by weight, respectively. When such cascade is burned, the purity of silicon oxide produced as a result is as low as 90% and the carbon content becomes 1 to 10% by weight, so that the quality of silicon oxide degrades.

(3) Burning Condition of Biomass Cascade

The heating and burning temperature of the biomass cascade with appropriate contents of the hexose, the pentose and lignin is 400 to 1200° C. When the temperature is below 400° C., since the hexose, the pentose and lignin slightly existing in the cascade are not thermally decomposed and remain in the cascade, the purity of silicon oxide after the burning process is lowered and the carbon content is increased. In addition, when the burning temperature exceeds 1200° C., the silicon oxide is crystallized (becomes cristobalite).

Meanwhile, it is necessary to heat and burn the biomass cascade for a long time at a temperature exceeding 900° C. to produce silicon oxide whose purity exceeds 96% from biomass cascade containing a lot of hexose, pentose and polyphenol exceeding their appropriate amounts defined by the present invention. In this case, the silicon oxide provided as a result is crystallized (becomes cristobalite). Thus, in the case where the biomass cascade contains the hexose and/or pentose and polyphenol satisfying the appropriate range defined by the present invention, even when it is heated up to 1200° C. beyond 900° C., amorphous silicon oxide can be provided and through the high-temperature burning, the impurity is thermally decomposed and removed, so that the purity of silicon oxide can be 97% or more.

In addition, a more preferable burning temperature is 900° C. to 1100° C. When the burning temperature is within the above temperature range, the thermal decomposition of the impurity contained in the biomass cascade is further accelerated and as a result, the silicon oxide content can be as high as 97% or more. In addition, since the thermal decomposition can be implemented stably for a short time at the temperature of 900 to 1100° C., high-purity amorphous silicon oxide can be produced with a high degree of economic efficiency.

(4) High-Purity Amorphous Silicon Oxide Powder and Material Formed of it

The amorphous silicon oxide powder produced from the biomass cascade under the production condition according to the present invention contains 0.5% by weight or less of carbon, and 0.7% by weight or less of metal elements of potassium (K), phosphorus (P), calcium (Ca), sodium (Na), aluminum (Al), magnesium (Mg), and iron (Fe). In addition, the amorphous silicon oxide powder contains 96% by weight or more of silicon oxide ($SiO_2$).

In a case where the carbon content exceeds 0.5% by weight, when a crucible material is formed of the high-purity amorphous silicon oxide powder, the heat resistance of the manufactured crucible is low and the life thereof is short. Similarly, in a case where the total content of the metal elements of potassium (K), phosphorus (P), calcium (Ca), sodium (Na), aluminum (Al), magnesium (Mg), and iron (Fe) exceeds 0.7% by weight, when the amorphous silicon oxide powder is used as a raw material of cosmetics such as foundation, there is fear that it adversely affects the skin. Furthermore, in a case where the amorphous silicon oxide is used as a high-strength concrete reinforcement, when the carbon content exceeds 0.5% by weight, a chemical admixture such as a water reducing agent or an AE agent is absorbed, and when the silicon dioxide ($SiO_2$) content is 96% by weight or less, sufficient strength improvement cannot be provided. In addition, when amorphous silicon oxide having purity less than 96% is used, strength of the concrete is improved as compared with crystalline silicon oxide, but when amorphous silicon oxide having purity of 96% or more is used, the concrete material can be stronger.

In addition, the high-purity amorphous silicon oxide powder according to the present invention can be used as a reinforcing material (strengthening material) dispersed in a fire brick in the shape of powder or filler. Similar to the case where it is used as the crucible material or the concrete reinforcing material, when the carbon content exceeds 0.5% by weight, an effect as the reinforcing material of the fire brick cannot be provided.

Furthermore, the high-purity amorphous silicon oxide powder according to the present invention can be used for a coating material as pigment and/or additive agent, and a function such as corrosion resistance can be improved in a coating film. Furthermore, when the high-purity amorphous silicon oxide powder is used as a reinforcing agent or an additive agent in a rubber material, a function such as strength can be improved.

The coating material provided as described above can be applied to a metal material such as steel, a non-ferrous material, plastic material, inorganic material and the like. A coating method includes brush coating, spray coating, powder coating, electrodeposition coating and the like. The rubber material can be used for a packing material, sealing material, watch band, grip material of a golf club and the like, and a function such as strength can be improved in those usages.

Furthermore, a filter or a filtering material can be provided using the high-purity amorphous silicon oxide powder according to the present invention, and a paper product, cloth product, glass product, and food product added with the high-purity amorphous silicon oxide powder can be provided. Furthermore, since the high-purity amorphous silicon oxide powder has a preferable far-infrared radiation effect depending on the process condition, a far-infrared radiation composition or a far-infrared radiation material mixed with this powder can be provided.

Furthermore, the inventors of this application have found that high whiteness degree can be implemented with the high-purity amorphous silicon oxide powder according to the present invention. Therefore, more free coloring and the like can be implemented with this powder.

(5) Whiteness Degree of High-Purity Amorphous Silicon Oxide Powder

According to a conventional extracting method of silicon oxide powder, since an alkaline component ($K_2O$, $CaO$) and a cellulose component of chaff remain, when a predetermined amount or more of biomass is burned for a short time, the following phenomenon is generated.

a) The cellulose component is not sufficiently burned at a temperature below about 700° C., so that whiteness is not satisfactorily provided.
b) Since silica reacts with the alkaline component at a temperature above about 700° C. and a part of it becomes cristobalite (glass), whiteness cannot be provided. When it is burned at higher temperature (1000° C. or more) and it is completely crystallized, although whiteness is provided, it is no longer amorphous silica.

Meanwhile, according to the present invention, since the cellulose (=carbon) content and the alkaline component content are set at a certain standard level or less in the starting raw material before burning through the previous process, even when a certain amount or more of biomass is burned at any temperature, as long as oxygen atmosphere is enough for burning, a high whiteness degree can be provided. Especially, since a strict temperature adjustment is difficult in a furnace in many cases in practical use, the fact that preferable whiteness can be provided through the high-temperature burning process is a great advantage.

(6) Far-Infrared Radiation Effect of High-Purity Amorphous Silicon Oxide Powder

According to the high-purity amorphous silicon oxide powder produced by the present invention, far-infrared emissivity is high as compared with germanium and tourmaline or commercially available mineral-derived silica which are said to have a high far-infrared radiation effect in general. Therefore, the high-purity amorphous silicon oxide powder according to the present invention is expected to be applied to a health-related product.

WORKING EXAMPLE 1

Chaff (300 g) was immersed in a hydrochloric acid aqueous solution (concentration: 5%, temperature: room temperature, process time: 15 minutes) and hydrolyzed and washed with distilled water and dried (50 to 60° C.) in the atmosphere. According to quantitative analysis of components contained in a sample after quantitative analysis, cellulose (reduced quantity): 1.4% by weight, hemicellulose (reduced quantity): 1.2% by weight, lignin (reduced quantity): 33% by weight, total content of alkaline metal: 1.13% by weight (K: 0.49% by weight, Na: 0.33% by weight, P: 0.11% by weight, Ca: 0.08% by weight, Al: 0.06% by weight, Mg: 0.05% by weight, Fe: 0.01% by weight). The sample (10 g) was burned for 10 minutes in a muffle furnace. Inside of the furnace was the atmosphere and the burning temperature was set to values shown in Table 1.

TABLE 1

| Sample | Hydrolyzation by Acid Solution | Temperature (° C.) | Content (% by Weight) | | | | | | | | Total Content of Alkaline Metals | Crystal Structure of $SiO_2$ | Remarks |
| --- | --- | --- | --- | --- | --- | --- | --- | --- | --- | --- | --- | --- | --- |
| | | | Carbon | $SiO_2$ | K | Na | P | Ca | Al | Mg | Fe | | | |
| 1 | Yes | 480 | 0.43 | 96.2 | 0.29 | 0.15 | 0.08 | 0.07 | 0.05 | 0.04 | <0.01 | 0.68 | Amorphous | Inventive Example |
| 2 | Yes | 645 | 0.38 | 96.4 | 0.27 | 0.16 | 0.07 | 0.07 | 0.05 | 0.04 | <0.01 | 0.66 | Amorphous | Inventive Example |
| 3 | Yes | 790 | 0.27 | 96.6 | 0.28 | 0.14 | 0.07 | 0.07 | 0.05 | 0.03 | <0.01 | 0.64 | Amorphous | Inventive Example |
| 4 | Yes | 880 | 0.18 | 96.7 | 0.29 | 0.13 | 0.06 | 0.06 | 0.04 | 0.04 | <0.01 | 0.62 | Amorphous | Inventive Example |
| 5 | Yes | 1000 | 0.11 | 97.0 | 0.26 | 0.11 | 0.04 | 0.04 | 0.03 | 0.02 | <0.01 | 0.50 | Amorphous | Inventive Example |

TABLE 1-continued

| Sample | Hydrolyzation by Acid Solution | Temperature (°C.) | Content (% by Weight) | | | | | | | | Total Content of Alkaline Metals | Crystal Structure of $SiO_2$ | Remarks |
|---|---|---|---|---|---|---|---|---|---|---|---|---|---|
| | | | Carbon | $SiO_2$ | K | Na | P | Ca | Al | Mg | Fe | | | |
| 6 | Yes | 1080 | 0.06 | 97.1 | 0.22 | 0.11 | 0.03 | 0.05 | 0.03 | 0.04 | <0.01 | 0.48 | Amorphous | Inventive Example |
| 7 | Yes | 1170 | 0.03 | 97.2 | 0.23 | 0.09 | 0.03 | 0.04 | 0.02 | 0.03 | <0.01 | 0.44 | Amorphous | Inventive Example |
| 8 | Yes | 320 | 1.78 | 90.2 | 0.43 | 0.30 | 0.10 | 0.08 | 0.06 | 0.04 | 0.01 | 1.02 | Amorphous | Comparative Example |
| 9 | Yes | 1240 | 0.03 | 97.3 | 0.19 | 0.06 | 0.03 | 0.03 | 0.02 | 0.03 | <0.01 | 0.36 | Crystalline | Comparative Example |
| 10 | No | 645 | 4.78 | 85.7 | 0.64 | 0.45 | 0.30 | 0.11 | 0.08 | 0.04 | 0.05 | 1.67 | Amorphous | Comparative Example |
| 11 | No | 930 | 3.14 | 89.1 | 0.46 | 0.41 | 0.27 | 0.09 | 0.07 | 0.04 | 0.04 | 1.38 | Crystalline | Comparative Example |
| 12 | No | 1030 | 1.41 | 92.1 | 0.39 | 0.36 | 0.22 | 0.08 | 0.07 | 0.03 | 0.04 | 1.19 | Crystalline | Comparative Example |
| 13 | No | 1170 | 0.93 | 93.6 | 0.31 | 0.30 | 0.18 | 0.07 | 0.06 | 0.02 | <0.01 | 0.94 | Crystalline | Comparative Example |
| 14 | No | 480 | 6.23 | 77.6 | 0.79 | 0.51 | 0.30 | 0.11 | 0.09 | 0.06 | 0.06 | 1.92 | Amorphous | Comparative Example |
| 15 | No | 320 | 7.96 | 72.4 | 0.81 | 0.56 | 0.32 | 0.12 | 0.10 | 0.06 | 0.06 | 2.03 | Amorphous | Comparative Example |

Contents of carbon, alkaline metal elements and silicon oxide in each sample were quantitatively analyzed. In addition, a crystal structure of silicon oxide was analyzed by X-ray diffraction to determine whether it was amorphous or crystalline. The result is shown in Table 1 and FIG. 2.

As a comparison example, a chaff sample (10 g) that was not hydrolyzed was heated and burned in the muffle furnace and various kinds of analysis were made for the sample similarly. In addition, according to quantitative analysis result for the components of the chaff, cellulose (reduced quantity): 20.8% by weight, hemicellulose (reduced quantity): 20.5% by weight, lignin (reduced quantity): 20.5% by weight, water: 10.1% by weight, total content of alkaline metal: 2.16% by weight (K: 0.84% by weight, Na: 0.58% by weight, P: 0.35% by weight, Ca: 0.15% by weight, Al: 0.10% by weight, Mg: 0.08% by weight, Fe: 0.06% by weight), and ash 18.6% by weight.

As shown in Table 1, according to samples 1 to 7 as examples of the present invention, since the hydrolyzed chaff having the appropriate components was heated and burned at the temperature within the appropriate range, amorphous silicon oxide contains 0.5% by weight or less of carbon, 96% by weight or more of silicon oxide, and 0.7% by weight or less of alkaline metal elements. Especially, when the burning temperature is 900° C. or more, purity of silicon oxide can be 97% or more. In addition, the content of alkaline metal is reduced by the hydrolyzing process with the acid solution, and the content is further reduced by the following heating and burning process.

Meanwhile, according to samples 8 to 15 as comparison examples, the following problems were caused.

Sample 8: Residual carbon content was as high as 1.78% by weight because the burning temperature was as low as 320° C., and the total content of the alkaline metal elements was as high as 1.02% by weight, and as a result, purity of silicon oxide was low.

Sample 9: Silicon oxide was crystallized because the burning temperature was as high as 1240° C.

Samples 10 to 15: Since the hydrolyzing process with the acid solution was not performed, the residual carbon content and alkaline metal content were high and as a result, the purity of silicon oxide was low.

Figure 2:
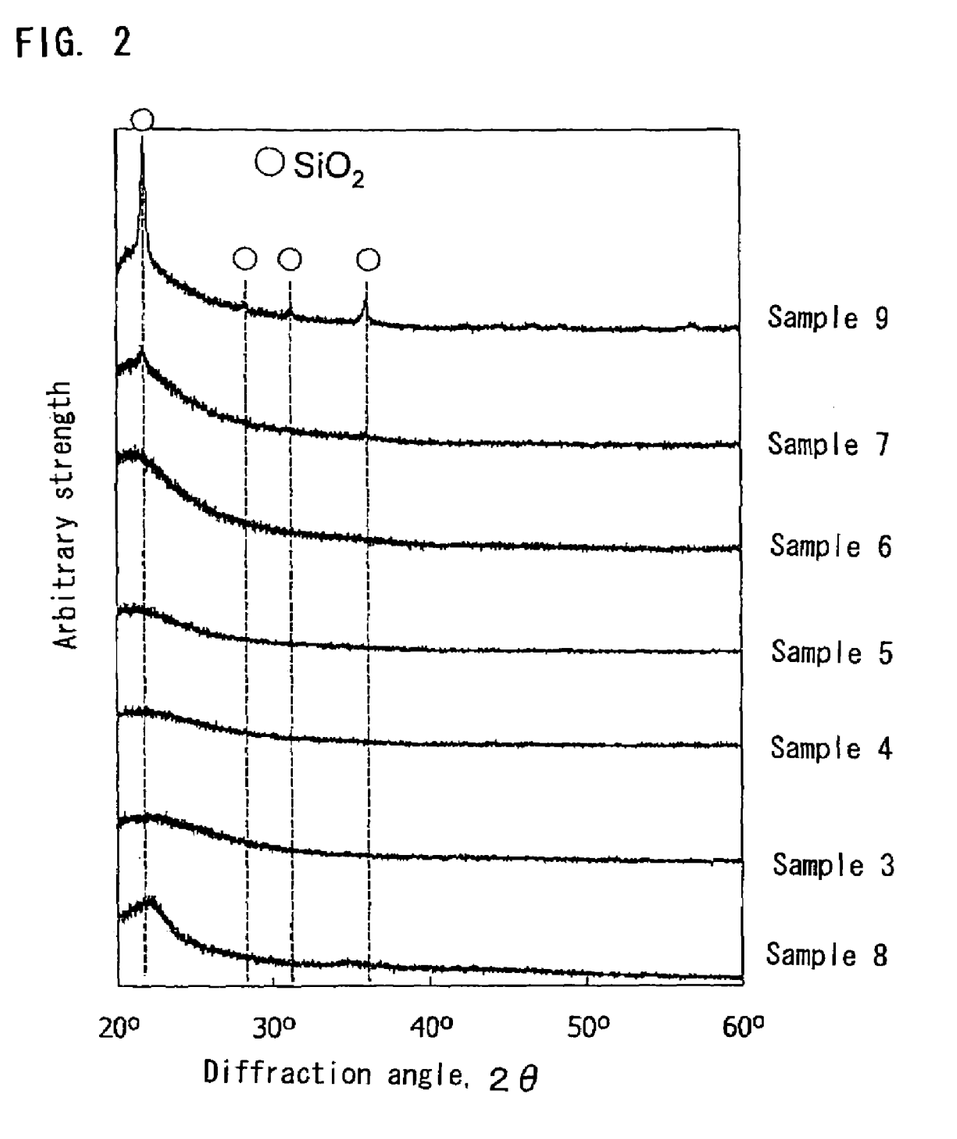
FIG. 2 is a view showing an X-ray diffraction result of a sample provided by burning chaff hydrolyzed with an acid solution.

FIG. 2 shows X-ray diffraction result of the samples provided by hydrolyzing chaff with the acid solution and burning it. According to the sample 9, it has been confirmed that silicon oxide is crystallized since a diffraction peak of crystallized silicon oxide ($SiO_2$) is detected because of the high-temperature burning at 1240° C. as described above. However, the sample heated and burned at the temperature within the appropriate range shows a broad diffraction pattern and the diffraction peak of silicon oxide is not detected, so that it has been confirmed that silicon oxide has an amorphous structure.

Figure 3:
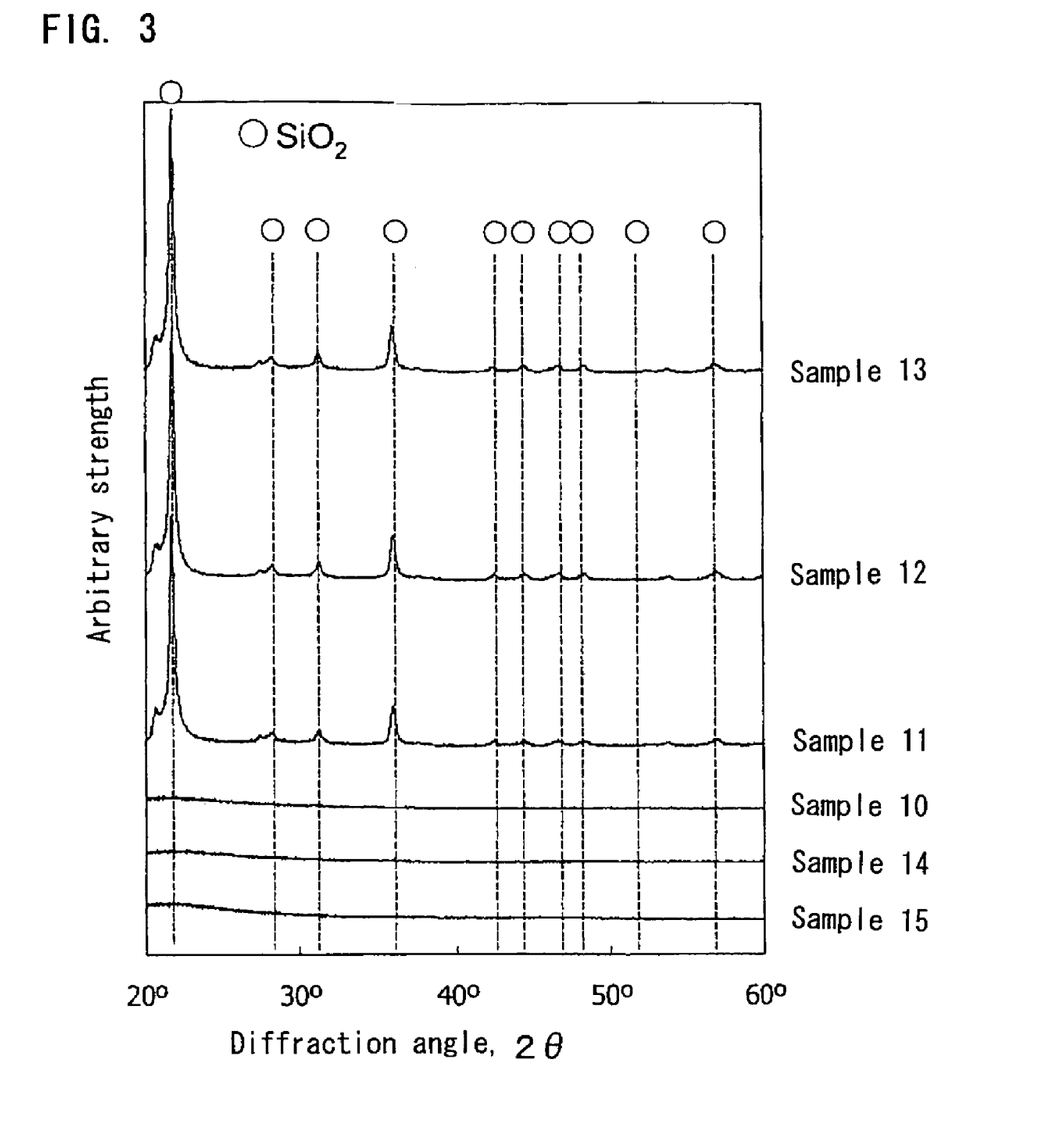
FIG. 3 is a view showing an X-ray diffraction result of a sample provided by burning chaff not hydrolyzed with an acid solution.

FIG. 3 shows X-ray diffraction result of the samples provided by burning chaff that is not hydrolyzed. According to the samples 11 to 13, silicon oxide is crystallized because they were burned at temperatures above 900° C.

WORKING EXAMPLE 2

Chaff (100 kg) was prepared as the biomass starting raw material and a first hydrolyzing process was performed with diluted sulfuric acid (concentration: 1%, temperature: 160° C., process time: 5 minutes) and a second hydrolyzing process was performed on residue (biomass cascade) provided after solid-liquid separation, with diluted sulfuric acid (concentration: 1%, temperature: 200° C., process time: 2 minutes). Then, residual cascade was extracted through solid-liquid separation again. Thus, an ethanol fuel was produced from the hexose solution (main component: hemicellulose) provided by the first hydrolyzing process and from the pentose solution (main component: cellulose) provided by the second hydrolyzing process, with fermenter (yeast) suitable for each of them, and as a result, about 14 liters of ethanol was produced from 100 kg of chaff.

According to quantitative analysis for components contained in the residual cascade after the second hydrolyzing process, cellulose (reduced quantity): 0.6% by weight, hemicellulose (reduced quantity): 0.7% by weight, lignin (reduced quantity): 28% by weight, and total content of alkaline metal: 1.19% by weight (K: 0.44% by weight, Na: 0.36% by weight, P: 0.15% by weight, Ca: 0.09% by weight, Al: 0.08% by weight, Mg: 0.05% by weight, and Fe: 0.02% by weight).

Thus, 20 g of residual cascade after the second hydrolyzing process was heated and burned at each temperature shown in Table 2 in the atmosphere for 10 minutes and contents of carbon, alkaline metal elements and silicon oxide in each sample were examined by quantitative analysis. In addition, a crystal structure of silicon oxide was analyzed by X-ray diffraction. Their result is shown in Table 2.

TABLE 2

| Sample | Temperature (° C.) | Content (% by Weight) | | | | | | | | Total Content of Alkaline Metals | Crystal Structure of SiO$_2$ | Remarks |
|---|---|---|---|---|---|---|---|---|---|---|---|---|
| | | Carbon | SiO$_2$ | K | Na | P | Ca | Al | Mg | Fe | | | |
| 11 | 600 | 0.35 | 96.4 | 0.25 | 0.16 | 0.08 | 0.06 | 0.06 | 0.04 | <0.01 | 0.65 | Amorphous | Inventive Example |
| 12 | 830 | 0.27 | 96.5 | 0.24 | 0.14 | 0.07 | 0.07 | 0.05 | 0.03 | <0.01 | 0.60 | Amorphous | Inventive Example |
| 13 | 950 | 0.17 | 97.0 | 0.22 | 0.14 | 0.05 | 0.05 | 0.04 | 0.02 | <0.01 | 0.52 | Amorphous | Inventive Example |
| 14 | 1035 | 0.15 | 97.1 | 0.21 | 0.12 | 0.05 | 0.05 | 0.03 | 0.02 | <0.01 | 0.48 | Amorphous | Inventive Example |
| 15 | 1110 | 0.06 | 97.2 | 0.20 | 0.11 | 0.03 | 0.05 | 0.03 | 0.04 | <0.01 | 0.46 | Amorphous | Inventive Example |
| 16 | 1260 | 0.04 | 97.4 | 0.12 | 0.08 | 0.02 | 0.03 | 0.03 | 0.03 | <0.01 | 0.31 | Crystalline | Comparative Example |
| 17 | 350 | 1.66 | 90.6 | 0.47 | 0.27 | 0.12 | 0.08 | 0.06 | 0.04 | 0.01 | 1.05 | Amorphous | Comparative Example |

As shown in Table 2, according to samples 11 to 15 as examples of the present invention, since the biomass cascade having the appropriate components was heated and burned at the temperature within the appropriate range, amorphous silicon oxide contains 0.5% by weight or less of carbon, 96% by weight or more of silicon oxide, and 0.7% by weight or less of alkaline metal elements. Especially, when the burning temperature is 900° C. or more, purity of silicon oxide can be 97% or more.

Meanwhile, according to a sample 16 as a comparison example, silicon oxide was crystallized due to high burning temperature of 1260° C. According to a sample 17, a residual carbon content was as high as 1.66% by weight and a total content of alkaline metal elements is high as 1.05% by weight due to low burning temperature of 350° C. and as a result, the purity of silicon oxide was low.

WORKING EXAMPLE 3

Several kinds of biomass starting raw materials (10 kg) shown in Table 3 were prepared and a first hydrolyzing process was performed with diluted sulfuric acid (concentration: 0.7 to 1.2%, temperature: 140 to 200° C., process time: 1 to 10 minutes) and a second hydrolyzing process was performed on residue (biomass cascade) provided after solid-liquid separation, with diluted sulfuric acid (concentration: 0.8 to 1.5%, temperature: 160 to 220° C., process time: 1 to 5 minutes). Then, residual cascade is extracted through solid-liquid separation again. Thus, an ethanol fuel was produced from the hexose solution provided by the first hydrolyzing process and from the pentose solution provided by the second hydrolyzing process, with fermenter (yeast) suitable for each of them, in each biomass starting raw material. Then, 20 g of residual cascade after the second hydrolyzing process was heated and burned at each temperature shown in Table 3 in the atmosphere for 10 minutes. Contents (reduced quantity) of hexose, pentose, and polyphenol and total content of alkaline metal elements in the cascade before burning, and contents of carbon and silicon oxide and total content of alkaline metal elements after burning are shown in Table 3. In addition, the crystal structure of silicon oxide of the sample after burning was analyzed by X-ray diffraction. Their result is shown in Table 3.

TABLE 3

| | | | Before Burning (After Hydrolyzation) | | | | After Burning | | | | |
|---|---|---|---|---|---|---|---|---|---|---|---|
| Sample | Biomass Starting Raw Material | Burning Temperature (° C.) | Hexose | Pentose | Polyphenol | Total Content of Alkaline Metals | Carbon | SiO$_2$ | Total Content of Alkaline Metals | Crystal Structure of SiO$_2$ | Remaks |
| 21 | Bagasse | 750 | 0.3 | 0.4 | 34 | 1.23 | 0.28 | 96.2 | 0.54 | Amorphous | Inventive Example |
| 22 | Bagasse | 920 | 0.3 | 0.4 | 34 | 1.23 | 0.20 | 97.0 | 0.51 | Amorphous | Inventive Example |
| 23 | Bagasse | 1000 | 0.3 | 0.4 | 34 | 1.23 | 0.14 | 97.1 | 0.46 | Amorphous | Inventive Example |
| 24 | Corn | 780 | 0.4 | 0.5 | 31 | 1.07 | 0.29 | 96.3 | 0.53 | Amorphous | Inventive Example |
| 25 | Corn | 880 | 0.4 | 0.5 | 31 | 1.07 | 0.23 | 96.4 | 0.50 | Amorphous | Inventive Example |
| 26 | Corn | 980 | 0.4 | 0.5 | 31 | 1.07 | 0.16 | 97.1 | 0.47 | Amorphous | Inventive Example |
| 27 | Thinned Wood | 950 | 0.2 | 0.2 | 37 | 0.72 | 0.20 | 97.0 | 0.44 | Amorphous | Inventive Example |
| 28 | Construction Debris | 985 | 0.2 | 0.3 | 36 | 0.69 | 0.16 | 97.1 | 0.42 | Amorphous | Inventive Example |
| 29 | Cassava | 850 | 0.5 | 0.8 | 28 | 1.13 | 0.23 | 96.4 | 0.53 | Amorphous | Inventive Example |
| 30 | Cassava | 1020 | 0.5 | 0.8 | 28 | 1.13 | 0.09 | 97.3 | 0.41 | Amorphous | Inventive Example |

TABLE 3-continued

| | | | Before Burning (After Hydrolyzation) | | | | After Burning | | | | |
|---|---|---|---|---|---|---|---|---|---|---|---|
| Sample | Biomass Starting Raw Material | Burning Temperature (° C.) | Hexose | Pentose | Polyphenol | Total Content of Alkaline Metals | Carbon | $SiO_2$ | Total Content of Alkaline Metals | Crystal Structure of $SiO_2$ | Remaks |
| 31 | Eucalyptus | 880 | 0.3 | 0.5 | 30 | 1.41 | 0.22 | 96.5 | 0.52 | Amorphous | Inventive Example |
| 32 | Rice Straw | 930 | 0.7 | 0.5 | 35 | 1.39 | 0.18 | 97.0 | 0.51 | Amorphous | Inventive Example |
| 33 | Rice Straw | 1040 | 0.7 | 0.5 | 35 | 1.39 | 0.13 | 97.3 | 0.43 | Amorphous | Inventive Example |
| 34 | Rice | 860 | 0.6 | 0.5 | 31 | 1.62 | 0.25 | 96.5 | 0.54 | Amorphous | Inventive Example |
| 35 | Rice | 1010 | 0.6 | 0.5 | 31 | 1.62 | 0.12 | 97.2 | 0.44 | Amorphous | Inventive Example |
| 36 | Sweet Potato | 730 | 0.5 | 0.7 | 29 | 1.28 | 0.25 | 96.2 | 0.56 | Amorphous | Inventive Example |
| 37 | Sweet Potato | 870 | 0.5 | 0.7 | 29 | 1.28 | 0.22 | 96.4 | 0.54 | Amorphous | Inventive Example |

As shown in Table 3, in each biomass raw material, since the cascade was heated and burned at the temperature within the appropriate temperature range, amorphous silicon oxide contains 0.5% by weight or less of carbon, 96% by weight or more of silicon oxide, and 0.7% by weight or less of alkaline metal elements.

WORKING EXAMPLE 4

Each burned sample produced in the working example 1 was crushed and ground in a mortar to produce fine silicon oxide powder having a diameter of 20 to 250 μm. The silicon oxide powder was solidified and baked to manufacture a cup-shaped crucible material. This was heated from room temperature to 1200° C. and held for 30 minutes and cooled. These heating and cooling operations were repeated five times and damage of the crucible material was examined. As a result, according to the samples 1 to 7 and 9, since a carbon content was 0.5% by weight or less, surface crack and the like was not generated at all and preferable heat resistance was provided. Meanwhile, according to the samples 8, 10 to 15, since a carbon content was higher than 0.5% by weight, a fine crack was generated on the crucible surface.

WORKING EXAMPLE 5

The sample 4 as the example of the present invention and the sample 9 as the comparison example among the samples produced in the working example 1 were prepared and crushed and ground in a mortar to produce fine silicon oxide powder having a diameter of 0.2 to 20 μm. These were added and mixed into a concrete by 10% by weight, and a concrete block was manufactured and its strength characteristics were evaluated. As a result, according to the concrete added with the silicon oxide powder of the sample 4, the strength is higher by about 25% than that of a concrete to which silicon oxide powder is not added. Meanwhile, according to the concrete added with the particle of the sample 9, the strength is higher by about 7%. Thus, it has been confirmed that the high-purity amorphous silica particle is effective as a mortar concrete reinforcing material.

WORKING EXAMPLE 6

Whiteness degree of the high-purity amorphous silicon oxide powder provided by the method of the present invention was compared with that of silicon oxide powder provided by the conventional method.

The whiteness degree was measured as follows.
Measurement device: Powder whiteness tester (C-100) produced by Kette Electric Laboratory
Whiteness degree measurement range: 0 to 110
Whiteness degree scale: The whiteness degree is divided into 100 equal parts assuming that a whiteness degree of a surface to which magnesium oxide extremely fine powder generated when magnesium is burned is attached is set to 100 (international standard) and a whiteness degree of a dark state having no incident light is set to 0. However, since an Mg extremely fine powder attached surface inevitably deteriorates, this cannot be used as a standard material.
Standard material: Standard plate made of milk glass (84.4)
Filter: Blue (440 nm cut)
Measurement method: JIS Z8722 (reflectivity measurement method by photodiode)

a) The Present Invention Example 1

After a pretreatment (bio-ethanol extraction), it was burned at 800° C.
Crystal structure: Amorphous
Whiteness degree: 86.5 b) The Present Invention Example 2

After a pretreatment (acid treatment), it was burned at 800° C.
Crystal structure: Amorphous
Whiteness degree 73.4 c) Comparison Example 1

It was burned at 550° C. without performing an acid treatment
Crystal structure: Amorphous
Whiteness degree: 32.3 d) Comparison Example 2

It was burned at 800° C. without performing an acid treatment
Crystal structure: Mostly amorphous but partially cristobalite
Whiteness degree 6.1

WORKING EXAMPLE 7

Far-infrared radiation effect of the high-purity amorphous silicon oxide powder provided by the process in the working example 1 was compared with a far-infrared radiation effect of another material.

(1) Measurement Method
a) Device
  FTIR device (system 2000 type produced by Perkin Elmer)
  Integrating sphere (RSA-PE-200-ID produced by Labsphere) Inside is coated with gold.
  Integrating sphere entrance bore φ16 mm, Measurement bore φ24 mm
b) Measurement Condition
  Measurement region 370 to 7800 $cm^{-1}$ (effective range: 400 to 6000 $cm^{-1}$)
  Integrating number 200, Light source MIR, Detector MIR-TGS Resolution 16 $cm^{-1}$, Beamsplitter optkbr
  A light path from the light source to the detector was filled with $N_2$ gas and a purge was conducted.
c) Measurement Method
  A room temperature reflection spectrum was measured with a material under test and emissivity was calculated from the above data at room temperature (20° C.), 400° C., 600° C., 800° C., and 1000° C.

(2) Measurement Result
a) Infrared emissivity of high-purity amorphous silicon oxide powder according to the present invention
  20° C.: 83
  400° C.: 76
  600° C.: 67
  800° C.: 59
  1000° C.: 52
b) Commercially Available Silica
  20° C.: 75
  400° C.: 62
  600° C.: 49
  800° C.: 41
  1000° C.: 31
c) Germanium 20° C.: δ 400° C.: 49 600° C.: 46 800° C.: 44 1000° C.: 43
d) Tourmaline
  20° C.: 81
  400° C.: 73
  600° C.: δ
  800° C.: 59
  1000° C.: 53

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be used advantageously as high-purity amorphous silicon oxide powder.

The invention claimed is:

1. A production method of amorphous silicon oxide powder comprising:
  a step of preparing a chaff or rice straw containing hexose and/or pentose and containing silicon oxide as a starting raw material;
  a step of immersing and hydrolyzing said starting raw material with nitric acid, hydrochloric acid, sulfuric acid, phosphoric acid or organic acid to reduce a content of said hexose to 10% by weight or less and/or a content of said pentose to 20% by weight or less and a total content of metal elements of potassium (K), phosphorous (P), calcium (Ca), sodium (Na), aluminum (Al), magnesium (Mg), and iron (Fe) in said starting material is 1.5% by weight or less based on a weight of the starting material, and
  a step of burning residue yielded in the hydrolyzing step at a temperature of 900° C. to 1100° C. to obtain amorphous silicon oxide powder, where a carbon content is 0.5% by weight or less, the total content of metal elements of potassium (K), phosphorous (P), calcium (Ca), sodium (Na), aluminum (Al), magnesium (Mg), and iron (Fe) is 0.65% by weight or less, and an amorphous silicon oxide content is 96% by weight or more.

2. The production method of the amorphous silicon oxide powder according to claim 1, wherein
  a content of polyphenol in said residue yielded in the hydrolyzing step is 40% by weight or less.

* * * * *